US008764367B2

(12) United States Patent
McCabe

(10) Patent No.: US 8,764,367 B2

(45) Date of Patent: Jul. 1, 2014

(54) SEPARATOR FOR ARTICLES OF LAUNDRY

(76) Inventor: Stanley G. McCabe, Lubbock, TX (US)

( * ) Notice: Subject to any disclaimer, the term of this patent is extended or adjusted under 35 U.S.C. 154(b) by 89 days.

(21) Appl. No.: 13/151,151

(22) Filed: Jun. 1, 2011

(65) Prior Publication Data

US 2012/0308339 A1 Dec. 6, 2012

(51) Int. Cl.

*D06F 95/00* (2006.01)
*B65G 25/00* (2006.01)

(52) U.S. Cl.

USPC ...... 414/13; 414/418; 198/468.01; 198/690.2

(58) Field of Classification Search

USPC ........... 414/13, 418; 198/369.2, 369.4, 369.6, 198/690.2, 725, 468.01, 731, 728; 38/34
IPC ........................................................ B65G 15/42
See application file for complete search history.

(56) References Cited

U.S. PATENT DOCUMENTS

| | | | | |
|---|---|---|---|---|
| 2,679,820 | A * | 6/1954 | Petrilli | 118/30 |
| 3,981,390 | A * | 9/1976 | Richard | 198/690.2 |
| 4,437,247 | A * | 3/1984 | Wiebesiek | 38/143 |
| 4,447,972 | A | 5/1984 | McCabe | |
| 4,943,198 | A * | 7/1990 | McCabe | 414/13 |
| 4,997,081 | A * | 3/1991 | Sutin | 198/728 |
| 5,079,867 | A * | 1/1992 | Kober et al. | 38/2 |
| 5,172,502 | A * | 12/1992 | Kober | 38/7 |
| 6,082,946 | A * | 7/2000 | Jensen | 414/13 |
| 6,287,066 | B1 * | 9/2001 | Heinz et al. | 414/13 |
| 7,073,312 | B2 * | 7/2006 | Battisti | 53/537 |
| 7,284,667 | B2 * | 10/2007 | Weir | 209/617 |
| 7,448,152 | B2 * | 11/2008 | Jensen et al. | 38/143 |
| 7,555,857 | B2 | 7/2009 | McCabe | |
| 7,827,709 | B2 * | 11/2010 | McCabe | 38/143 |
| 7,836,617 | B2 * | 11/2010 | McCabe | 38/143 |
| 2004/0073332 | A1 | 4/2004 | Weir | |
| 2004/0105736 | A1 * | 6/2004 | Nielsen | 414/13 |
| 2005/0028409 | A1 | 2/2005 | McCabe | |
| 2005/0028410 | A1 | 2/2005 | McCabe | |

(Continued)

FOREIGN PATENT DOCUMENTS

DE 101 53 835 A1 5/2003

OTHER PUBLICATIONS

PCT International Search Report and Written Opinion of the International Searching Authority dated Oct. 26, 2012 for corresponding PCT Patent Application No. PCT/US2012/040448.

(Continued)

*Primary Examiner* — Gregory Adams
*Assistant Examiner* — Lynn Schwenning
(74) *Attorney, Agent, or Firm* — Lempia Summerfield Katz LLC

(57) ABSTRACT

A separator separates sheets from a bundle. Slack in the strap used to raise and lower a clamp is used to determine when the clamp reaches the bundle. A non-horizontal conveyor tilts beneath the clamp to receive multiple articles, and then tilts over another bin to deposit the articles. The second bin includes an angled surface, which is straightened to shift the articles for clamping. The clamp is supported by, but not attached to, a support connected with the drive. When the clamp reaches the pile, the clamp stops but the support may continue to move. The clamp is tiltable. The article is transferred by an air jet onto a surface with a roller separated from the surface. Upon transfer, the roller forms a nip with the surface. The article is deposited on an exit conveyor having a flexible, raised portion.

17 Claims, 3 Drawing Sheets

(56) References Cited

U.S. PATENT DOCUMENTS

| | | | | |
|---|---|---|---|---|
| 2006/0124433 | A1 | 6/2006 | Weir | |
| 2007/0239545 | A1* | 10/2007 | Mothwurf | 705/14 |
| 2008/0092415 | A1 | 4/2008 | McCabe | |
| 2008/0298930 | A1 | 12/2008 | McCabe | |
| 2010/0275793 | A1* | 11/2010 | Eaves | 100/35 |

OTHER PUBLICATIONS

PU 12 Pick-Up, "Separating and Transfer Device for High Performance Feeding Systems." Herbert Kannegiesser GmbH, May 2011.

* cited by examiner

SEPARATOR FOR ARTICLES OF LAUNDRY

BACKGROUND

The present invention relates to automated laundry separators or other laundry processing devices.

Many processes in laundries are automated. For example, machines in hotels spread out, iron, and fold sheets without operator intervention. To begin the automated process, the operator identifies either corners or an edge of the sheet and places the corners or edge into a spreader machine. Since sheets have large dimensions with thin fabric, the sheets are often tangled together, necessitating either an automated separator machine or an operator for manually locating the edges or corners.

A separator receives a jumble or bundle of articles, such as a compressed cake of linen or cartor cart (e.g., truck) of sheets from a washer or dryer. The separator separates individual articles from the bundle and outputs individual pieces or a few pieces together for easier feeding into the next stage of automated processing. Where possible, automated processes may save money over time. However, machines for automatically grabbing sheets or other articles of laundry (e.g., sheets) from a load of articles have been attempted. Such devices operate too slowly or have maintenance problems, such as due to rapid, yanking oscillation of components.

BRIEF SUMMARY

By way of introduction, the preferred embodiments described below include apparatuses and methods for clamping and/or separating articles of laundry from a bundle or pile of articles of laundry. One embodiment of a separator includes a plurality of stages and features. Each of the individual stages may be used in different apparatuses. Each individual stage is used with or without other stages. Any of the overall structure, individual stages, combinations of individual stages, and associated methods of the embodiments discussed below may be claimed independently herein.

In a first stage, a strap is used to raise and lower a clamp. Slack in the strap is used to determine when the clamp reaches the bundle for clamping and triggering raising of the clamp. In a second stage, a non-horizontal conveyor tilts beneath the clamp to receive multiple articles, and then tilts over another bin to deposit the articles while conveying towards the other bin. In a third stage, the second bin includes a hinged or angled surface. The surface is straightened to shift the articles towards a clamp and relaxed or bent to keep too many articles from piling up at the clamp. In a fourth stage, the clamp or clamps are supported by, but not attached to, a support connected with the drive. When the clamp or clamps reach the pile of articles, the clamp or clamps stop but the support may continue to move, allowing easier drive control. In a fifth stage, the clamp is tiltable in two directions, such as downward and upward. By titling away from a direction of travel when passing an article, the clamp is less likely to get caught or damage the article. In a sixth stage, the article is transferred by an air jet onto a surface with a roller separated from the surface. Upon transfer, the roller forms a nip with the surface with the article in the nip. In a seventh stage, the article is deposited on an exit conveyor. The exit conveyor has a flexible, raised portion to push and/or drag the article at a rapid speed to the exit.

In a first aspect, an apparatus is provided for separating articles of laundry. A first clamp is positioned to clamp at least one of the articles of laundry from a first bin, lift the at least one article of laundry, and release the at least one article of laundry. A first conveyor is tiltable from (1) a first position at a first angle above horizontal and blocking the first clamp from the first bin to (2) a second position at a second angle above horizontal and spacing the first conveyor away from blocking the first clamp from the first bin. The first and second angles are on opposite sides of vertical. The first clamp is positioned to release the at least one article above the first conveyor while the first conveyor is in the first position and positioned to clamp the at least one article while the first conveyor is in the second position.

In a second aspect, a method is provided for separating sheets. One or more sheets are clamped from a first bundle. The one or more sheets are removed from the first bundle while clamping. The one or more sheets are positioned into a bin as a second bundle. A first sheet of the second bundle is clamped. The first sheet is removed from the second bundle while clamping.

In a third aspect, a clamping arrangement is provided for clamping an article of laundry. A first clamp support is positioned, with or without connection, to support a first laundry clamp. A drive operatively connects with the first clamp support. The first clamp support moves in response to operation of the drive. The first laundry clamp moves with the first clamp support until the first laundry clamp is blocked. The first clamp support is operable to move away from and then return to the first laundry clamp when the first laundry clamp is blocked.

In a fourth aspect, an apparatus is provided for separating articles of laundry. A first clamp is tiltable towards and away from a bin and is operable to clamp an article of laundry from the bin while titled towards the bin. A deposit platform is spaced from the bin. The first clamp is movable from the bin to the deposit platform while the article of laundry is clamped. The first clamp is operable to release the article of laundry while adjacent to the deposit platform. After release of the article of laundry, the first clamp is operable to tilt away from the bin while returning to the bin.

In a fifth aspect, an apparatus is provided for separating articles of laundry. A clamp is moveable between a gripping position and a release position. A strap connects with the clamp. A drive connects with the strap. The drive is operable to raise and lower the clamp with the strap. A spring trigger is adjacent the strap. The spring trigger is operable to change position in response to the strap being slack. A sensor is adjacent to the spring trigger and connects with the drive. The sensor is operable to sense the change in the position, and the drive is operable to reverse direction in response to the sensor sensing the change in the position.

In a sixth aspect, an apparatus is provided for separating articles of laundry. A conveyor has a belt. A drive is operable to move the belt of the conveyor. A strap is on the belt. The strap is flexible and rises above the belt. A deposit device is operable to deposit articles of laundry onto the belt while the drive moves the belt. An exit location is downstream of the conveyor. The strap is operable to push the articles of laundry to the exit location.

In a seventh aspect, an apparatus is provided for assisting in separating articles of laundry. A clamp is operable to clamp one of the articles of laundry from the bundle in the bin and remove at least part of the one article. A plate forms a barrier for the bundle in the bin. The plate has first and second positions with first and second, different amounts of angling, respectively. A drive is operable to move the plate between the first and second positions. A sensor is operable to control the drive as a function of a position of the bundle relative to the clamp.

In an eighth aspect, an apparatus is provided for separating articles of laundry. A second roller is moveable between a first position forming a nip with a first roller and a second position spaced from the first roller. An air jet is positioned adjacent the first roller. The air jet is operable to blow an article of laundry onto the first roller. The second roller is in the second position when the air jet blows the article of laundry onto the first roller and moves to the first position after the air jet begins to blow the article of laundry onto the first roller.

In a ninth aspect, an apparatus is provided for separating articles of laundry. A first clamp is positioned to clamp at least one of the articles of laundry from a first bin, lift the at least one article of laundry, and release the at least one article of laundry. A first conveyor is tiltable from (1) a first position at a first angle above horizontal and blocking the first clamp from the bin to (2) a second position at a second angle above horizontal and spacing the first conveyor away from blocking the first clamp from the first bin. The first and second angles are on opposite sides of vertical. The first clamp is positioned to release the at least one article above the first conveyor while the first conveyor is in the first position and positioned to clamp the at least one article while the first conveyor is in the second position. The first conveyor is operable to convey the at least one article into a second bin. A second clamp is operable to clamp a first article of laundry from the second bin. A second clamp support is positioned to support the second clamp. A first drive operatively connects with the second clamp support. The second clamp support moves in response to operation of the drive. The second clamp moves with the second clamp support until the second clamp is blocked by the articles of laundry in the second bin. The second clamp support is operable to move away from and then return to the second clamp when the first laundry clamp is blocked. The second clamp is tiltable towards and away from the second bin and operable to clamp the first article of laundry from the second bin while titled towards the bin. A deposit platform is spaced from the second bin. The second clamp is movable from the second bin to the deposit platform while the first article of laundry is clamped. The second clamp is operable to release the first article of laundry while adjacent to the deposit platform. After release of the first article of laundry, the second clamp is operable to tilt away from the bin while returning to the bin.

In a tenth aspect, a method is provided for separating articles of laundry. A plurality of articles of laundry is gripped from a first bin. The plurality of articles is deposited onto a non-horizontal conveyor. The non-horizontal conveyor is tilted to another position. The plurality of articles is conveyed from the non-horizontal conveyor into a second bin. Individual ones of the articles of laundry in the second bin are clamped. The individual ones of the articles of laundry are deposited onto a second conveyor. The second conveyor conveys the individual ones of the articles of laundry to an exit location.

The present invention is defined by the following claims, and nothing in this section should be taken as a limitation on those claims. Further aspects and advantages of the invention are discussed below in conjunction with the preferred embodiments.

BRIEF DESCRIPTION OF SEVERAL VIEWS OF THE DRAWINGS

The components of the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

FIGS. 1-5 show various aspects of one embodiment of a separator. Various stages and aspects of the embodiment may be altered or changed based on now known or later developed devices or methods. The separator isolates the articles of laundry from a load or bundle of articles. Various stages or aspects may be used in other types of devices, such as spreaders, ironers or folders. For example, the strap for raising and lowering the clamp or the tiltable clamp stages may be used in a spreader.

The separator described herein is adapted for separating rectangular or square sheets. For example, flannel or cotton sheets in single, double, queen and/or king sizes are processed. A given bundle may include only articles of the same type and size, but may include a mix of types and/or sizes. Larger or smaller articles of laundry may also be processed, such as blankets, comforters, towels, pillow cases, pillow shams, or other laundry articles. The articles are wet, damp, or dry. For example, the articles are in a cake or laundry cart after removal from a washing or drying machine.

FIGS. 1-5 show one apparatus positioned within a single frame structure. Different portions of the apparatus are shown in different views to illustrate the components in operation of various stages for separating a sheet. In one embodiment, the stages are built together within the frame in as small a space as possible while providing sufficient volume for separating sheets. Various plates for safety and preventing operators from entanglement within the separator are included, but not shown. Electrical, hydraulic, and/or air pressure cables and hoses interconnect various components for controlling and operating separating of the sheets. These cables and hoses are configured and routed as is known in the art or later developed. One or more controllers also control the actions of various components as is known. A user interface may be provided for establishing different settings or monitoring operation. Air nozzles may be used to flatten, remove folds, and/or position the article throughout the process.

Sensors for determining proper position, layout, or errors in processing, such as infrared, light, contact, or optical sensors, are used at any position or stage of processing. The sensors provide input for controlling the conveyors, clamps, drives or other components. Any now known or later developed sensors may be used.

Different clamping mechanisms, drives, sensors, conveyors, linkages, or other devices are described below. Any now known or later developed types of these devices may be used. The options for one device are not repeated in all cases, but the other devices of the same type may be any of the options mentioned for the one device.

FIGS. 1-5 show the separator mechanics as well as the method of separating articles of laundry. Sheets are shown at different stages of the process of separation.

Figure 1:
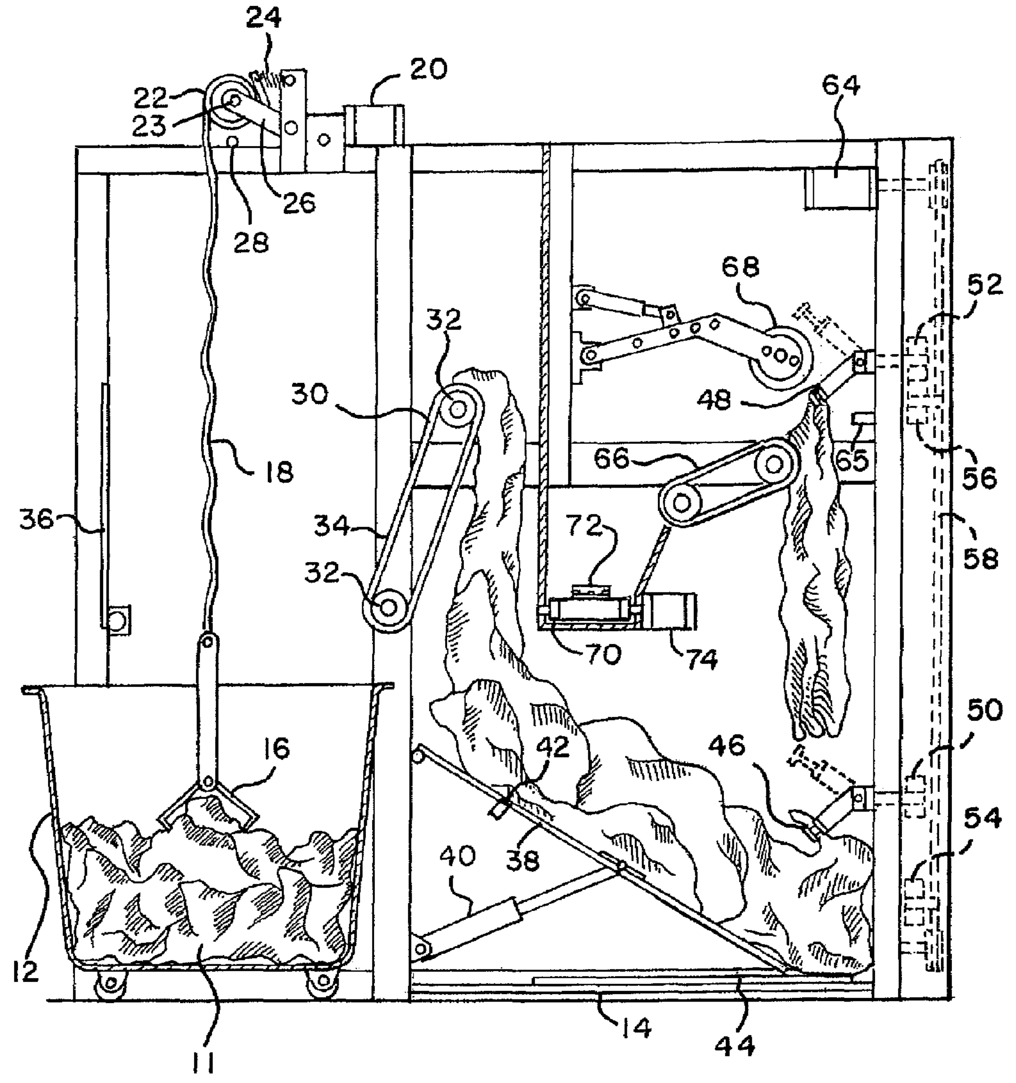
FIGS. 1 and 2 are side views of a laundry separator according to one embodiment.
Figure 2:
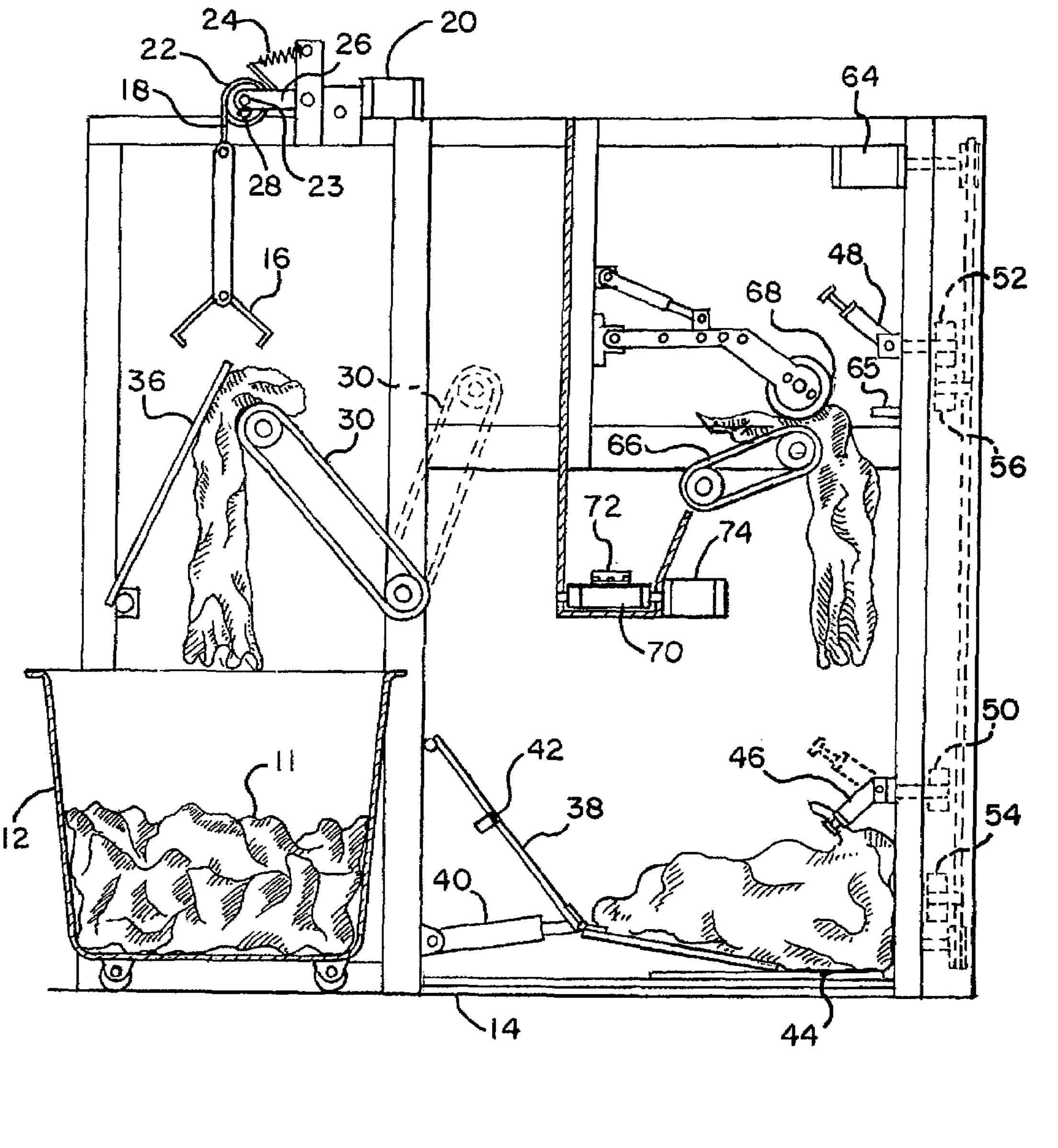

The sheets begin in a bundle 11 in a bin 12. The bin 12 is a cake holder, trough, top of a conveyor, bag, laundry cart, or other device for holding a collection of articles of laundry. As shown in FIGS. 1 and 2, the bin 12 is a laundry cart. Clamps, latches, divots, or other holders may be used to position and hold the laundry cart under the clamp 16. The laundry cart may be removed for reloading or to be replaced by another laundry cart full of articles. The bin 12 may be continuously fed with articles of laundry or may have discrete cakes or batches.

Another bin 14 is positioned adjacent to the bin 12. The other bin 14 is of the same or different type of device. For example, the other bin 14 is a fixed part of the separator. The other bin 14 is formed by side walls and a bottom, creating a volume to hold a pile of articles. The other bin 14 is of any shape, such as including angled walls to dispose the articles of laundry towards one or more pick-up or clamping locations.

The articles of laundry are processed in two general stages. In a first general stage, one or more articles, such as 1-20 articles, are separated from a cake or bundle. To separate and transfer initially, the articles become less compact and/or tangled. These articles are deposited in the second general stage as a loosened bundle of articles. In the second bin 14, the articles are more loosely bundled. The articles are removed from the second bin 14 individually, but more than one article may be removed at a time from the second bin 14.

The clamping from the second bin 14 occurs independently of the operation of the clamping from the first bin 12. As the bundle 11 dwindles or the first bin 12 is emptied, the cart or first bin 12 may be moved or replaced. A new cake may be conveyed or placed in bin 12 or a new bin 12 with a bundle 11 is added. While the clamping for the first bin 12 ceases, the clamping and removing for the second bin 14 continues.

In the first general stage, a clamp 16 removes the articles from the bin 12. The clamp 16 is operable to clamp the articles of laundry in the bundle 11 in the bin 12. The clamp 16 is a chuck, scissor clamp, two opposing plates, jaws, pinching roller, pinching conveyors, vacuum device, combinations thereof, or other structures operable to hold one or more sheets. In one embodiment, the clamp 16 includes two jaws with ridges or other texture (e.g., rubber gripping surface). The clamp 16 is sized grip a plurality of articles at a same time, such as each jaw being about 6-12 inches in length with about ½ the length being textured flat surface for contact with the articles. Plastic, metal, wood or other materials may be used.

The clamp 16 connects with a rail or guide. For example, a telescoping guide system is provided. The telescoping guide may allow the clamp 16 to be raised without extending the guide into a ceiling. The guide and clamp 16 are rotatable so that the clamp 16 extends downward to different locations in the bin 12. For example, the clamp 16 is positioned at +/− about 10 degrees to clamp articles in different halves or ends of the bin 12. Alternatively, the guide is fixed to guide the clamp 16 to a same location in the bin 12 each time.

The clamp 16 moves between a gripping position in the bin 12 (see FIG. 1) and a release position above the bin 12 (see FIG. 2). The gripping position is on top of the bundle 11, on an article of laundry, or the bottom of the bin 12. The gripping position may be different depths within the bin 12 at different times depending on the bundle 11. The clamp 16 moves until blocked or stopped. The gripping position is wherever the clamp 16 is stopped in the bin 12.

To better break apart a cake of articles, the clamp 16 may be weighted or driven downward. Lead, iron, or other weights are added so that the clamp 16 impacts the bundle 11 with greater force, momentum, and/or velocity. Alternatively, no extra weight is added.

During movement to the bin 12 of the clamp 16 and during clamping by the clamp 16, the conveyor 30 is tilted away from the path of travel of the clamp 16. FIG. 1 shows the conveyor 30 titled to allow the clamp 16 to move to and be in the bin 12.

Once in the bin 12 at the gripping position, the clamp 16 clamps one or more articles of laundry. Two or more, such as five to fifteen articles, may be clamped at a same time. The clamp 16 is actuated by pneumatic cylinders, so one or both jaws of the clamp 16 connect with the pneumatic cylinder. In alternative embodiments, an electric servo, an air driven cylinder, a hydraulic cylinder, a motor, a valve or other mechanisms are provided for actuating the clamp 16.

After clamping, the clamp 16 lifts the gripped articles of laundry. The grip is maintained while pulling articles from the bundle 11. None, some, or all of the articles may remain tangled and be pulled from the clamp 16. The clamp 16 hoists articles of laundry from the bundle 11. Resistance may be sensed and the clamp 16 opened if sufficient resistance is provided.

When the clamp 16 reaches the release position, the clamp 16 is opened. The articles of laundry are released and fall. The clamp 16 releases the articles after reaching the release position and after the conveyor 30 is titled into position below the clamp 16 (see FIG. 2). In the release position, the clamp 16 is positioned to release the articles above the conveyor 30 while the conveyor 30 is in a position to intercept or receive the articles.

Timing of the drive mechanism 20 and/or electric light sensors are used to detect that the article of laundry and/or clamp 16 is positioned at the release location. For example, a light sensor detects the presence of the clamp 16. As another example, an encoder on the drive 20 or an associated pulley determines that the clamp 16 is hoisted to the desired height.

The clamp 16 is hoisted by a strap 18. The strap 18 is a belt, such as a nylon belt. Rope, chain, or other cord may be used. The strap 18 connects with the clamp 16. The connection is direct or indirect. For example, the strap 18 connects with part of the guide holding the clamp 16. In alternative embodiments, a screw drive, gears, pneumatic or rodless cylinders, rack and pinion, or other mechanism connects the drive 20 to the clamp 16.

The strap 18 extends from the drive 20, over a pulley 22, and to the clamp 16. Other routes, such as over additional pulleys or without a pulley, may be provided. As the drive 20 extends or withdraws the strap 18, the clamp 16 raises or lowers from the pulley 22.

The drive 20 is an electric, pneumatic, or hydraulic drive. Other motors may be used. The drive 20 connects with the strap 18. The drive 20 includes a transmission, clutch, gears, pulley, and/or other structure to pull in and withdraw the strap 18. By rotating the drive shaft, the strap 18 raises and lowers the clamp 18. Gravity acting on the clamp 16 keeps tension on the strap 18 during the raising and lowering.

In one embodiment, a spring trigger is adjacent the strap 18. The spring trigger senses a position of the clamp 16, such as senses when the clamp 16 is in the gripping position. In alternative embodiments, an optical or other sensor is used.

Figure 3A:
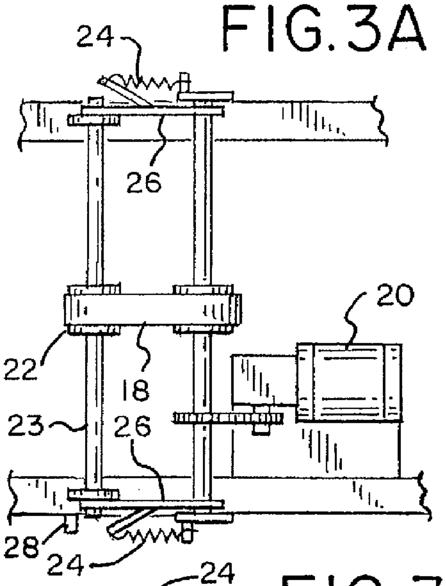
FIG. 3A shows a top view and FIGS. 3B and 3C show two side views of a spring trigger for a laundry clamp arrangement according to one embodiment.
Figure 3B:
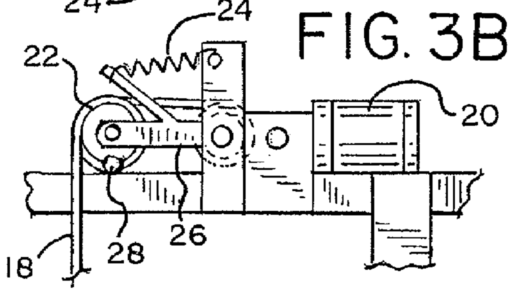
Figure 3C:
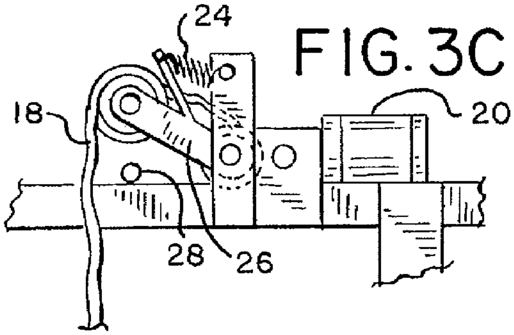

FIGS. 3A-C show an example embodiment of the spring trigger. The spring trigger includes one or more springs 24, the pulley 22 and a sensor 28. The pulley 22 has an axle 23 connected with one or more arms 26. The arms 26 allow the axle 23 and pulley 22 to move in response to force from the spring 24. Additional, different, or fewer components may be provided.

The spring 24 is a metal or plastic coil spring. Rubber or other bands may be used as the spring 24. The spring 24 connects with the arm 26, the axle 23, or both. The spring 24 applies force to dispose the pulley 22 at a location, such as force to lift the pulley 22. The arms 26 rotate to allow the lifting. The weight of the clamp 16 as transmitted by the strap 18 over the pulley 22 is sufficient to counter act the spring force. While the clamp 16 is suspended by the strap 18, the pulley 22, axle 23, strap 18, and/or arm 26 block or do not block the sensor 28.

The sensor 28 is an optical, infrared, light, or other sensor. Mechanical sensors, such as a contact switch, may alternatively be used.

When the clamp 16 is lowered onto the bundle 11, the strap 18 becomes slack. By removing the downward force from the clamp 16 on the strap 18, the spring 24 lifts the pulley 22. The lifting moves the pulley 22, the axle 23, and/or arms 26, activating the sensor 28 by lack of blocking or by moving into a blocking state. The spring trigger changes positions in response to the strap 18 being slack, triggering the sensor 28.

The sensor 28 electrically connects with the drive 20. The electrical connection may be direct or through one or more controllers. The sensor 28 detects the change in position due to the clamp 16 reaching the gripping position. In response, the drive 20 is caused to stop and/or reverse. After the drive 20 lowers the clamp 16, the drive 20 stops or reverses slightly for the clamp 16 to clamp the articles of laundry. The drive 20 then fully reverses to hoist the clamp 16 by the strap 18. The tension returns to the strap 18, resetting the spring trigger. Using an electrical control and sensors, the drive 20 positions the clamp 16 adjacent to or in the loads of laundry at the pick-up locations and positions the clamp 16 at the release location.

Once at the release location, the clamp 16 opens. The clamp 16 may delay opening to allow the conveyor 30 to be tilted to a position below the clamp 16. The articles are transferred to the conveyor 30. The conveyor 30 is one or more endless belts over first and second rollers. The rollers are of metallic, plastic or rubber material, and the belt is fabric, rubber, plastic or other material. One or both of the rollers is driven. The rollers may be clutch rollers or other rollers. While two rollers are shown, three or more rollers may be provided with the belts extending over the three or more rollers.

The conveyor 30 is rotatable or pivotable. The rollers are mounted to a frame structure. The frame structure includes an axle or other structure about which the conveyor 30 rotates. In one embodiment, the pivot axis is the axle of the lower roller of the conveyor 30. The pivot axis may be the other roller, in between the rollers, or outside of the conveyor. The pivot axis is above the bin 12, such as just above, but may be below a top of or the entire bin 12.

When the conveyor 30 pivots, the uppermost roller changes position laterally along an arc about the pivot axis. The conveyor 30 pivots between two positions. FIGS. 1 and 2 show the two positions, one on each side of vertical. The range of angles about which the conveyor 30 tilts is about 45 degrees from vertical when leaning out over the bin 12 and about 5 degrees from vertical when leaning over the bin 14. Other asymmetric or symmetric ranges may be provided. The range includes a transition through vertical but with no horizontal position of the conveyor 30. In alternative embodiment, the range is all on one side of vertical and/or the conveyor 30 is horizontal in one position, such as over the bin 12.

In the position shown in FIG. 2, the conveyor 30 blocks, at least in part, the bin 12 from the clamp 16. In the position shown in FIG. 1, the conveyor 30 avoids blocking the access to the bin 12 of the clamp 16. The conveyor 30 tilts between the positions shown in FIGS. 1 and 2 cyclically to transfer the articles of laundry to the bin 14. The tilting is gradual, such as moving from one limit to the other while the clamp 16 descends from the release position to the gripping position and moving back while the clamp 16 is hoisted.

Constantly or while moving from over the bin 12 to over the bin 14, the conveyor 30 conveys the articles of laundry. The articles are dropped onto the end and/or upper long surface of the conveyor 30 as shown in FIG. 2. At that time, the belt or belts of the conveyor 30 move the articles towards the bin 14. The belt moving on top of the conveyor 30 conveys from the upper roller to the bottom roller. As the conveyor 30 tilts over the bin 14, the upper long surface becomes the lower long surface. The conveying continues. Both the conveying and the tilting act to deposit the articles into the bin 14. The conveying may act to further separate the articles of laundry from each other.

To limit or prevent the number of articles released by the clamp 16 that fall back into the bin 12, a blocking member 36 is provided. The blocking member 36 is a plate, comb, arms, mesh, roller, conveyor, barrier, or other structure for resting against or placing adjacent to the conveyor 30 when receiving articles from the clamp 30. Gravity or driven pressure may be used to press the articles against the conveyor 30 by the blocking member 36. Alternatively, the blocking member 36 remains spaced from the conveyor 30 but overlaps or leaves a small gap such that most of the articles remain on the conveyor 30.

When, after, or before the conveyor 30 begins to tilt towards the bin 14, the blocking member 36 is moved to a position to avoid interference with the clamp 16 and another gripped collection of articles (see FIG. 1). A sensor detects the clamp 16 and/or articles to trigger closing of the blocking member 36. Detection of the clamp 16 in the release position may be used to also trigger movement of the blocking member 36 and/or tilting of the conveyor 30 in one embodiment.

The articles of laundry are deposited into the bin 14 as another bundle. The conveyor 30 deposits the articles. The bin 14 is positioned below or at an exit side of the conveyor 30. The articles fall from the conveyor 30.

The articles fall onto other articles in the bin 14, onto a bottom or floor of the bin 14, or fall onto the plate 38. The plate 38 is one or more pieces forming a barrier in the bin 14. The plate 38 is metal, wood, glass, plastic, or other material. The plate 38 may have various shapes, including uniform or variable thickness. In alternative embodiments, the plate 38 is not provided.

In one embodiment, the plate 38 is hinged, such as two flat pieces hinged together. The top of the upper piece connects with the frame or the bin 14 and the bottom of the bottom piece slides along rails, the bottom of the bin 14 and/or the arm 44. The lateral extent of the plate 38 is from one side of the bin 14 to another to prevent articles from sliding between the plate 38 and the sides of the bin 14.

The plate 38 is angled or non-flat. In the embodiment shown in FIGS. 1 and 2, the plate 38 is angled by having two flat pieces hinged together. In other embodiments, the plate 38 is formed of flexible material with a natural or forced curve. The curvature provides the angling. The plate 38 is bendable, such as changing the angle between pieces or otherwise altering the curve.

The drive 40 is a pneumatic, hydraulic, or electric drive, such as an air cylinder. The drive 40 connects with part of the plate 38, such as connecting with one of the pieces or connecting in a generally center region. The drive 40 causes the plate 38 to bend or straighten by extending or reducing a length of an air cylinder shaft, screw drive, or telescoping armature. The adjustment of the drive causes more or less angling of the plate 38.

The plate 38 forms a barrier for the bundle in the bin 14. The barrier has different positions, depending on the number of articles in the bin 14. The drive 40 moves the plate 38 to different positions. For example, FIGS. 1 and 2 show the plate 38 at two different positions at the extremes of the range of movement. Greater or lesser ranges of movement may be provided. At each position, a different amount of angling is provided. For example, the angle between the two pieces is changed by the drive 40.

Gravity may be used to position the articles in the bin 14. The articles are picked up near clamp 46 at a pick-up location. The plate 38 controls, at least in part, the bundling or pile of articles. In the position with greater angling (e.g., 75-90 degrees), the articles are maintained in the bin 14 without or with less pushing to the pick-up locations. When fewer items are being clamped by the clamp 46 or when a sufficiently high pile of articles is at the plate 38, the plate 38 is straightened or adjusted to have less angling, causing at least some of the articles to slide or fall towards the pick-up location.

The sensor 42 is a light sensor, but other sensors may be used. The sensor 42 is positioned to sense a height of the pile of articles at the plate 38, at the pick-up location or other location. The sensor 42 is used to control operation of the drive 40 and bending of the plate 38. The control is to avoid bunching at the pick-up location of too many or too heavy a load and/or to avoid collecting articles spaced away from the pick-up location.

The movement of the plate 38 changes the volume of the bin 14. By increasing an angle away from horizontal of at least part of the plate 38, the articles of laundry may move towards the pick-up location. By decreasing the angle, the articles may be allowed to collect away from the pick-up location.

While only one clamp 46 may be provided, two or more clamps 46, 48 are provided to increase speed of separation. The clamps 46, 48 clamp at different locations, such as locations spaced apart by about two feet. More or less separation may be provided. Two pick-up locations along a same wall of the bin 14 are formed, but pick-up locations on different walls may be used.

The member 44 on the bottom of the bin 14 helps position articles at the pick-up locations. The member 44 is an arm or plate. The member 44 may include a knob, extension, or other protuberance to push or pull articles of laundry. The member 44 is plastic, metal, wood, or other material. Positioned at the bottom of the bin 14 or spaced from the bottom, the member 44 moves from side to side. The range of movement corresponds to the pick-up locations. The movement pushes or pulls articles side to side to the pick-up locations. For example, the member 44 moves the articles to different halves or different sides of the bin 14. One or more air jets, shaped plate 38, ridges, or other structure may alternatively or additional be used to cause the articles to tend to the pick-up locations.

The clamp 46 is any type of clamp. In one embodiment, the clamp 46 is two plates with a pneumatic cylinder to bring the plates together. One of the plates is moved towards another of the plates. The plates are sized to clamp one article (e.g., circular plates about two inches in diameter), but may end up clamping two or more articles.

The clamp 46 is moveable between a clamping position and a release position. One or more sensors may be provided for controlling operation of the clamps 46, 48. For example, sensors are positioned in the bin 14 to detect articles at the pick-up locations of the clamps 46, 48. If no articles of laundry are present at the pick-up locations, the clamps 46, 48 are not operated or moved.

Any drive mechanism may be used for moving the clamp 46. In one embodiment shown in FIGS. 1, 2, and 4, the clamp 46 is moved along a guide 58 by connection with a clamp block 50. With two clamps 46, 48, two guides 58, 60 are provided for corresponding clamp blocks 50, 52. A drive 64 (e.g., an electric motor) drives a pulley, such as a toothed pulley with an endless timing chain or belt 62. Alternatively, a wench, telescoping device or other mechanism for moving clamps 46, 48 is provided.

One or more clamp supports 54, 56 connect with the belt 62. The clamp supports 54, 56 also run along the guides 58, 60. The clamp supports 54, 56 are metal, wood, plastic, or other material. In one embodiment, the clamp supports 54, 56 have a block shape, but may be other shapes. The clamp blocks 50, 52 rest against or on top of the clamp supports 54, 56. The clamp blocks 50, 52 are of the same or different material and shape as the clamp supports 54, 56. A rubber, plastic or other material maybe provided on the clamp supports 54, 56 and/or clamp blocks 50, 52 to reduce noise or wear.

The drive 64 moves the clamp supports 54, 56 along the guides 58, 60. The clamp supports 54, 56 are connected opposite each other so that when one is at a release position, the other is at the clamping position. Movement is opposite of each other. Independent movement of the clamp supports 54, 56 is provided in other embodiments. The drive 64 moves the clamp supports 54, 56 the same amount for each cycle, running the clamp supports 54, 56 from the release position to the clamp position and back in each cycle. A sensor or timing senses when the clamp supports 54, 56 are at the positions and then reverses the drive 64 after any needed delay for operation of the clamps 46, 48.

Figure 4:
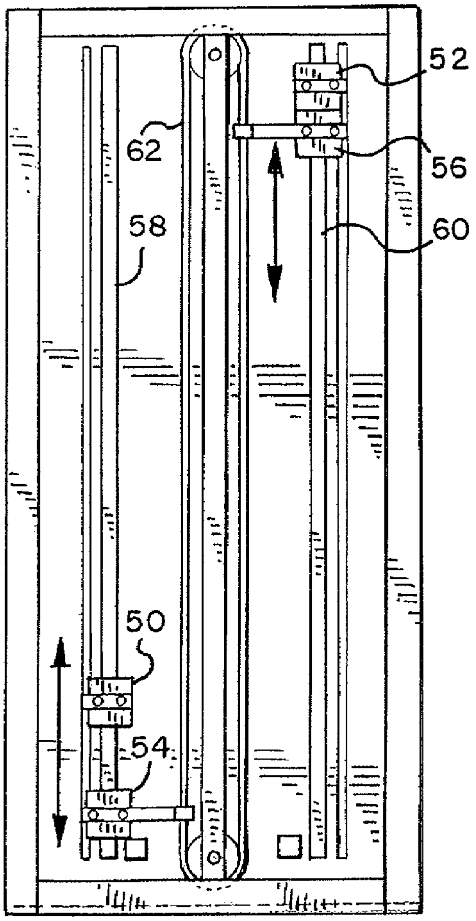
FIG. 4 is a side view of one embodiment of a clamp arrangement.

A clutch or sensor control to stop the drive 64 due to interference with the clamps 46, 48 is not needed. The clamp supports 54, 56 may move the full extent each cycle, allowing the clamps 50, 52 to be controlled by and moved by the same drive 64 and belt 62. The clamp blocks 50, 52 are not connected with the clamp supports 54, 56, but may be connected, such as with a flexible or elastic material. When one of the clamps 46, 48 reaches the pile of articles, the clamp 46, 48 may cease movement while the clamp support 54, 56 continues movement. As shown in FIGS. 1 and 4, the clamp support 54 continues to a predetermined position and the clamp block 50 separates from the clamp support 54 at a location determined by the current pile of articles. When the clamp 46 is blocked, the clamp block 50 ceases movement but the clamp support 54 continues movement. Until blockage, gravity keeps the clamp block 50 against the clamp support 54. As the clamp support 54 moves downward, the clamp block 50 also moves downwards. When the clamp support 54 is lifted upwards, the clamp block 50 is also lifted upwards once contact is made.

In the clamp or bin position, the clamps 46, 48 are closed to grip an article of laundry. The clamp 46, 48 is moved upwards with the article to the release position. At the release position, the clamp 46, 48 releases the article for deposit onto a deposit platform 66. The clamp 46, 48 moves past the release platform 66 while clamping the article and releases the article adjacent to the platform 66.

In one embodiment, the clamps 46, 48 are tiltable. The clamps 46, 48 are pivotably attached to the clamp blocks 50, 52. A pneumatic cylinder or other actuator causes the clamps 46, 48 to point generally downwards or upwards, but side to side tilting may be provided. The range of tilting is about 90 degrees, such as from 45 degrees downward to 45 degrees upward. Different symmetric or asymmetric ranges of tilting may be provided. The clamps 46, 48 are tiltable towards and way from the bin 14. In alternative embodiments, the clamps 46, 48 do not tilt or are not tiltable.

The clamps 46, 48 tilt away from the direction of travel. For example, when the clamp 46 is moving downward, the clamp 46 tilts upward, and when the clamp 46 is moving upward, the clamp 46 tilts downward. By tilting away from the direction of travel, the clamps 46, 48 may be less likely to tear, pull on or interfere with articles of laundry hanging in the path of travel. Opposite tilting may be used. Alternatively, the clamp 46 may tilt one direction for any movement and change tilt for other purposes, such as clamping or releasing.

The tilting may be used for clamping. The clamp 46 is tilted upwards when reaching the pile of articles in the bin 14. The clamp 46 is then driven to tilt downward towards the bin, more likely positioning an article of laundry in the clamp 46.

For release, the clamp 46 tilts upwards after releasing the article, but may tilt upward before release. After release, the clamp 46 is tilted upwards, clearing the way for the article to be pulled over the deposit platform 66. The clamp 46 is then in a position to tilt away from the bin 14 while returning to the bin 14.

The clamps 46, 48 remove individual articles from the bin 14. The articles are pulled from the pile by the clamps 46, 48 upward to the release position. The clamping occurs in synchronization. While one clamp 46 is clamping an article for removal, the other clamp 48 is releasing an article on the platform 66.

When the clamps 46, 48 release the articles, one or more air jets 65 blow on the articles. The air jets have nozzles, such as flat slit nozzles, for blowing compressed air. In response to or during the release, the air blows part of the article onto the release platform 66. The release platform 66 is adjacent but spaced from the run of the clamps 46, 48. In alternative embodiments, the clamp 46 is positioned over the release platform 66 to drop the article. In other embodiments, a rod or arm pushes the article onto the release platform 66.

The release platform 66 is a plate, roller, conveyor, or other device for receiving the articles. More than one release platform 66 may be provided, such as one for each clamp 46, 48. The release platform 66 is fixed or does not change position. Alternatively, the release platform 66 moves.

The release platform 66 is spaced from the bin 14, such as being above the bin 14. If an article is not positioned properly, the article falls back into the bin 14. As a conveyor, the release platform 66 conveys the article away from the clamp 46, 48 and towards an exit conveyor 70, towards an exit, or towards another device.

For keeping the article on the release platform 66, a roller 68 clamps down on, rests against, or otherwise holds the article against the platform 66. The roller 68 is free rolling or unpowered, but may have a brake and/or be driven.

The roller 68 is moveable by a drive, such as a pneumatic cylinder, between being spaced from the platform 66 and spaced against the platform 66. When placed adjacent to or against the platform 66, the roller 68 and the platform 66 form a nip. The nip keeps the article from slipping backwards while the article in conveyed from the platform 66.

When the air jet 65 operates, the roller 68 is spaced from the platform 66. The nip is not formed when the article is first blown onto the platform 66. As the air is blown, the roller 68 lowers on top of the article. In alternative embodiments, the air jet 65 blows the article into the nip.

The article is conveyed or moved off of the back of the platform 66. In one embodiment, the article is deposited onto an exit conveyor 70. Alternatively, the platform 66 is the exit conveyor and the article is output from the separator.

The exit conveyor 70 has two or more rollers 76, 78 and one or more endless belts 80. A drive 74 drives one of the rollers 76, 78 to move the cloth, fabric, rubber, or plastic belts. In one embodiment, a single endless belt is provided. The belt is of any width, such as 6-12 inches. Walls or plates are provided adjacent to the exit conveyor 70 (e.g., sides and bottom) to keep the article on the exit conveyor 70. The exit conveyor 70 is driven at a greater speed than the article is deposited from the platform 66. The exit conveyor 70 operates while the article is deposited. The greater speed tends to leave the article in a long narrow laid out arrangement on the exit conveyor 70. As each article is deposited, the exit conveyor 70 conveys each article sequentially downstream.

In one embodiment, the exit conveyor 70 is perpendicular in direction of conveyance to the platform 66. The exit conveyor 70 exits the separator on a side. Other positions or additional conveyors may be provided to output the separated articles where desired.

Figure 5:
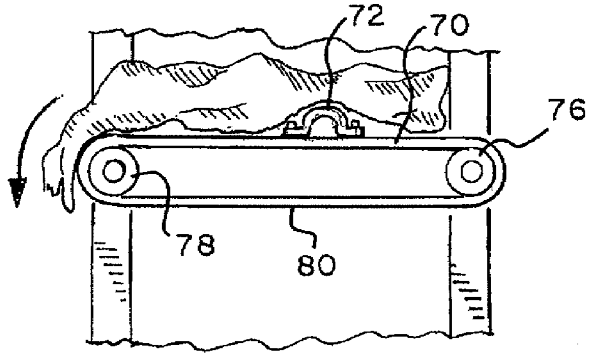
FIG. 5 is a side view of one embodiment of a conveyor with a flexible strap.

The exit conveyor 70 may include protrusions or be textured to better pull the article off of the platform 66 and lay the article on the exit conveyor 70 with the speed. In one embodiment, a strap 72 is provided as shown in FIG. 5. The strap 72 is flexible, such as being made from fabric, nylon or other belt material. The strap 72 is connected with the belt 80 of the exit conveyor, such as by stitching or rivets. The strap 72 rises above the belt 80, such as forming an arch. When on the top and bottom long runs of the exit conveyor 70, the strap 72 sticks away from the belt 80. On the ends, the strap 72 may stretch out or lay down flat against the belt 80. The strap 72 may be any width, such as having a width less than the belt 80.

Multiple pieces may be placed in parallel or side by side to form the single strap 72. Only one strap 72 is provided along the length of the exit conveyor 70. Alternatively, only two or three straps spaced apart along the path of travel of the belt 80 are provided. More than three straps 72 may be used.

The strap 72 acts to separate one article from another. For example, the clamps 46, 48 sequentially feed long sheets to respective platforms 66, which feed the sheets onto the conveyor 70. The sheets are long enough that they overlap. The strap 72 on the fast moving conveyor 70 either pulls or pushes part of each article, moving it out of the way or resulting in less overlap with the previous or subsequent article on the exit conveyor 70. The strap 72 pushes the articles of laundry to the exit location downstream of the exit conveyor 70.

While the invention has been described above by reference to various embodiments, it should be understood that many changes and modifications can be made without departing from the scope of the invention. For example, any number of additional stages may be provided. Different clamp, conveyor, sensor, actuator or drive structures may be used, including now known or later developed structures. It is therefore intended that the foregoing detailed description be understood as an illustration of the preferred embodiment of the invention and not as a definition of the invention. It is only the following claims, including all equivalents, that are intended to define the scope of the invention.

What is claimed is:

1. An apparatus for separating articles of laundry, the apparatus comprising:

a first clamp positioned to clamp at least one of the articles of laundry from a first bin, lift the at least one article of laundry, and release the at least one article of laundry; and a first conveyor, the first conveyor comprising an endless belt conveyor, the first conveyor tiltable from (1) a first position at a first angle above horizontal and blocking the first clamp from the first bin to (2) a second position at a second angle above horizontal and spacing the first conveyor away from blocking the first clamp from the first bin, the first and second angles on opposite sides of vertical, the first conveyor rotating the endless belt in opposite directions in the first and second positions;

the first clamp positioned to clamp the at least one article while the first conveyor is in the second position and positioned to release the at least one article above the first conveyor while the first conveyor is in the first position.

2. The apparatus of claim 1 further comprising:

a second bin positioned at an exit side of the first conveyor, the first conveyor conveying the at least one article to the second bin after the release by the first clamp.

3. The apparatus of claim 1 wherein the first conveyor tilts over a range of angles from the first angle to the second angle, the range not including horizontal.

4. The apparatus of claim 1 wherein the first conveyor comprises a belt over first and second rollers, the second roller being a pivot axis for the tilting and the first roller changing position laterally between the first and second positions, the belt moving on top of the conveyor to convey from the first roller to the second roller in the first position and moving on the bottom of the conveyor to convey from the first roller to the second roller in the second position.

5. The apparatus of claim 1 wherein the first conveyor pivotably connects with a frame at a location above the first bin with the first position leaning the first conveyor over the first bin and the second position leaning the first conveyor away from the first bin.

6. The apparatus of claim 1 further comprising:

a blocking member positioned at a first location against the first conveyor when the first conveyor is in the first position and positioned at a second location away from the first location when the first conveyor is in the second position, the blocking member blocking the at least one article from returning to the first bin when the first clamp releases.

7. An apparatus for separating articles of laundry, the apparatus comprising:

a conveyor having a belt;

a drive operable to move the belt of the conveyor; and a strap on the belt, the strap being flexible and raising above the belt;

a deposit device operable to deposit articles of laundry onto the belt while the drive moves the belt; and an exit location downstream of the conveyor, the strap operable to push the articles of laundry to the exit location.

8. The apparatus of claim 7 wherein the strap has a width less than the belt and arches over the belt when on a top of the conveyor and arches less when at ends of the conveyor.

9. The apparatus of claim 7 wherein the strap comprise one of only one or two straps on the conveyor.

10. An apparatus for separating articles of laundry, the apparatus comprising:

a first roller;

a second roller moveable between a first position forming a nip with the first roller and a second position spaced from the first roller: and an air jet positioned adjacent the first roller, the air jet operable to blow an article of laundry onto the first roller;

wherein the second roller is in the second position when the air jet blows the article of laundry onto the first roller without a nip for the article of laundry and moves to the first position, with the first roller against the second roller, after the air jet begins to blow the article of laundry onto the first roller.

11. The apparatus of claim 10 wherein the first roller comprises a roller of a conveyor, the conveyor operable to convey the article of laundry away from the air jet and second roller.

12. The apparatus of claim 10 wherein the second roller is free rolling.

13. An apparatus for separating articles of laundry, the apparatus comprising:

a first clamp positioned to clamp at least one of the articles of laundry from a first bin, lift the at least one article of laundry, and release the at least one article of laundry; and a first conveyor, the first conveyor comprising an endless belt conveyor, the first conveyor tiltable from (1) a first position at a first angle above horizontal and blocking the first clamp from the bin to (2) a second position at a second angle above horizontal and spacing the first conveyor away from blocking the first clamp from the first bin, the first and second angles on opposite sides of vertical, the first conveyor rotating the endless belt in opposite directions in the first and second positions;

the first clamp positioned to release the at least one article above the first conveyor while the first conveyor is in the first position and positioned to clamp the at least one article while the first conveyor is in the second position;

wherein the first conveyor is operable to convey the at least one article into a second bin;

a second clamp operable to clamp a first article of laundry from the second bin;

a second clamp support positioned to support the second clamp;

a first drive operatively connected with the second clamp support, the second clamp support moved in response to operation of the drive, wherein the second clamp moves with the second clamp support until the second clamp is blocked by the articles of laundry in the second bin, the second clamp support operable to move away from and then return to the second clamp when the first laundry clamp is blocked;

wherein the second clamp is tiltable towards and away from the second bin and operable to clamp the first article of laundry from the second bin while titled towards the bin; and a deposit platform spaced from the second bin, the second clamp movable from the second bin to the deposit platform while the first article of laundry is clamped, the second clamp operable to release the first article of laundry while adjacent to the deposit platform;

wherein after release of the first article of laundry, the second clamp is operable to tilt away from the bin while returning to the bin.

14. The apparatus of claim 13 wherein the first clamp is moveable between a gripping position and a release position; further comprising:

a strap connected with the first clamp;

a second drive connected with the strap, the second drive operable to raise and lower the first clamp with the strap;

a spring trigger adjacent the strap, the spring trigger operable to change position in response to the strap being slack; and a first sensor adjacent to the spring trigger and connected with the second drive, the sensor operable to sense the change in the position, the second drive operable to reverse direction in response to the sensor sensing the change in the position.

15. The apparatus of claim 13 further comprising:

a second conveyor having a belt;

a second drive operable to move the belt of the second conveyor; and a strap on the belt, the strap being flexible and raising above the belt;

wherein the deposit platform is operable to deposit the first article of laundry onto the belt while the second drive moves the belt.

16. The apparatus of claim 13 further comprising:

a plate forming a barrier in the second bin, the plate having first and second positions with first and second, different amounts of angling, respectively;

a second drive operable to move the plate between the first and second positions; and a sensor operable to control the drive as a function of a position of the bundle relative to the second clamp.

17. The apparatus of claim 13 for separating articles of laundry, the apparatus comprising:

a first roller moveable between a first position forming a nip with the deposit platform and a second position spaced from the deposit platform: and an air jet positioned adjacent the deposit platform, the air jet operable to blow the first article of laundry onto the deposit platform;

wherein the first roller is in the second position when the air jet blows the first article of laundry onto the deposit platform and moves to the first position after the air jet begins to blow the first article of laundry onto the deposit platform.

* * * * *